United States Patent
Niedert et al.

(10) Patent No.: US 10,933,824 B2
(45) Date of Patent: *Mar. 2, 2021

(54) METHODS AND APPARATUS FOR CATEGORIZATION OF VEHICLE LOADING AND DISPLAY THEREOF

(71) Applicant: Ford Global Technologies, LLC, Dearborn, MI (US)

(72) Inventors: Andrew Niedert, Farmington Hills, MI (US); Anton Rogness, Dearborn, MI (US); Elliott Pearson, Shelby Township, MI (US); Joshua Rajasingh, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/818,616

(22) Filed: Mar. 13, 2020

(65) Prior Publication Data
US 2020/0207294 A1    Jul. 2, 2020

Related U.S. Application Data

(63) Continuation of application No. 16/104,599, filed on Aug. 17, 2018, now Pat. No. 10,589,700.

(51) Int. Cl.
*G05D 1/02* (2020.01)
*B60R 16/023* (2006.01)
(Continued)

(52) U.S. Cl.
CPC ......... *B60R 16/0232* (2013.01); *B60K 35/00* (2013.01); *B60K 2370/11* (2019.05);
(Continued)

(58) Field of Classification Search
CPC ............... B60R 16/0232; B60K 35/00; B60K 2350/1004; B60K 2350/1096; G06F 3/04847; G06F 3/14
See application file for complete search history.

(56) References Cited

U.S. PATENT DOCUMENTS 3,971,008 A * 7/1976 Nishizaki .............. B66C 23/905
340/522
5,629,847 A * 5/1997 Shirakawa .......... B60R 21/0133
180/282
(Continued)

FOREIGN PATENT DOCUMENTS

DE    102012018213    3/2014
DE    102014001031    7/2015
(Continued)

OTHER PUBLICATIONS

United States Patent and Trademark Office, "Non-Final Office Action," issued in connection with U.S. Appl. No. 16/104,599, dated Jan. 11, 2019, 20 pages.
(Continued)

*Primary Examiner* — Munear T Akki
(74) *Attorney, Agent, or Firm* — Ray Coppiellie; Hanley, Flight & Zimmerman, LLC

(57) ABSTRACT

Methods, apparatus, systems and articles of manufacture are disclosed for categorization of vehicle loading and display thereof. An example method includes comparing a summation of first load data and second load data to a threshold, the first or second load data associated with input from a vehicle sensor or a user interface, sorting the first and second load data into one or more categories, each of the categories based on input associated with the first load data or the second load data, the load data including vehicle load data or external vehicle load data, and displaying the sorted load data.

20 Claims, 9 Drawing Sheets

(51) Int. Cl.
*B60K 35/00* (2006.01)
*G06F 3/14* (2006.01)
*G06F 3/0484* (2013.01)

(52) U.S. Cl.
CPC .... *B60K 2370/186* (2019.05); *G06F 3/04847* (2013.01); *G06F 3/14* (2013.01)

(56) References Cited

U.S. PATENT DOCUMENTS

| | | | | |
|---|---|---|---|---|
| 5,912,439 | A | * | 6/1999 | Eran .................... B60G 17/019 177/136 |
| 9,140,568 | B2 | | 9/2015 | Waite et al. |
| 9,347,845 | B2 | | 5/2016 | Gießibl |
| 10,589,700 | B2 | | 3/2020 | Niedert et al. |
| 2004/0226755 | A1 | * | 11/2004 | Pottebaum ......... G01G 23/3735 177/25.13 |
| 2005/0131605 | A1 | | 6/2005 | Nakamoto et al. |
| 2008/0007392 | A1 | * | 1/2008 | Hax .................. G01G 23/3728 340/440 |
| 2018/0215394 | A1 | * | 8/2018 | Trageser ............... B60P 3/1033 |
| 2019/0003877 | A1 | | 1/2019 | Aina et al. |

FOREIGN PATENT DOCUMENTS

| | | |
|---|---|---|
| DE | 102014216076 | 2/2016 |
| EP | 1512575 | 3/2005 |
| GB | 2549602 | 10/2017 |
| WO | 2017076480 | 5/2017 |
| WO | 2018171937 | 9/2018 |

OTHER PUBLICATIONS

United States Patent and Trademark Office, "Final Office Action," issued in connection with U.S. Appl. No. 16/104,599, dated Jul. 2, 2019, 17 pages.

United States Patent and Trademark Office, "Advisory Action," issued in connection with U.S. Appl. No. 16/104,599, dated Sep. 12, 2019, 2 pages.

United States Patent and Trademark Office, "Notice of Allowance and Fee(s) Due," issued in connection with U.S. Appl. No. 16/104,599, dated Nov. 6, 2019, 23 pages.

* cited by examiner

METHODS AND APPARATUS FOR CATEGORIZATION OF VEHICLE LOADING AND DISPLAY THEREOF

RELATED APPLICATION

This patent arises from a continuation of U.S. patent application Ser. No. 16/104,599 (now U.S. Pat. No. 10,589,700) filed on Aug. 17, 2018. U.S. patent application Ser. No. 16/104,599 is hereby incorporated herein by reference in its entirety. Priority to U.S. patent application Ser. No. 16/104,599 is claimed.

FIELD OF THE DISCLOSURE

This disclosure relates generally to vehicles and, more particularly, to methods and apparatus for categorization of vehicle loading and display thereof.

BACKGROUND

Misuse of a vehicle, either by intentional or unintentional means, can degrade the reliability of the misused vehicle. In some examples, the likelihood of vehicle misuse may be increased when a user of the vehicle is not knowledgeable about the size and/or size limits of a load applied to the vehicle. For example, this may lead the user of the vehicle to place too large of a quantity of cargo in the vehicle.

One such example of improper use is exceeding a predefined load threshold of the vehicle (e.g., overloading the vehicle). For example, overloading of the vehicle by weight (e.g., too many passengers in the vehicle, too much weight in the trunk/bed of the vehicle, too large a trailer towed by the vehicle, etc.) can occur due to unawareness of the loading limits of the vehicle and can significantly degrade the reliability of the vehicle.

SUMMARY

Methods and apparatus for categorization of vehicle loading and display thereof are disclosed. An example method includes comparing a summation of first load data and second load data to a threshold, the first or second load data associated with input from a vehicle sensor or a user interface. The example method also includes sorting the first and second load data into one or more categories, each of the categories based on input associated with the first load data or the second load data, the load data including vehicle load data or external vehicle load data. The example method further includes displaying the sorted load data.

An example method includes categorizing first load data and second load data associated with a vehicle into one or more categories, each of the categories based on sensor input associated with the first load data or user input associated with the second load data, the first load data including vehicle load data or the second load data including an external load on the vehicle. The example method also includes comparing a summation of the first and second load data to a threshold and generating an alert for display via a user interface when the summation of the first and second load data exceeds the threshold.

An example non-transitory computer readable storage medium includes instructions that, when executed, cause a processor to at least compare a summation of first load data and second load data to a threshold, the first or second load data associated with input from a vehicle sensor or a user interface. The example instructions further cause the processor to sort the first and second load data into one or more categories, each of the categories based on input associated with the first load data or the second load data, the load data including vehicle load data or external vehicle load data. The example instructions further cause the processor to display the sorted load data.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Overloading of (e.g., placing too much weight in or on) a vehicle, either by intentional or unintentional means, can degrade the reliability of the overloaded vehicle. In some examples, the likelihood of vehicle misuse may be increased when a user of the vehicle is not knowledgeable about the size and/or size limits of a load applied to the vehicle. For example, this may lead the user of the vehicle to place too large of a quantity of cargo in the vehicle.

One such example of overloading relative to a predefined load threshold of the vehicle involves placing to much weight above, in, or on the vehicle. For example, overloading of the vehicle by weight (e.g., too many passengers in the vehicle, too much weight in the trunk/bed of the vehicle, too large a trailer towed by the vehicle, etc.) can occur due to unawareness of the loading limits of the vehicle and can significantly degrade the reliability of the vehicle.

Additionally, vehicles have been implemented with sensors to measure loads on one or more portions of the vehicle (e.g., loads associated with occupants of the vehicle, loads associated with fuel of the vehicle, loads associated with cargo of the vehicle, loads associated with an accessory of the vehicle, loads associated with a trailer of the vehicle, etc.) in addition to communication options to allow a wireless device to wirelessly interface with the vehicle.

Example disclosed herein utilize the sensors to receive load data and further sort the load data by category (e.g., occupant category, fuel category, vehicle cargo category, accessory category, trailer category, etc.) and output the load data for display to a user of the vehicle. In some examples, the display of the loads by category can increase a user's awareness of various loads on the vehicle. Further, the examples disclosed herein can sum all of the received loads and at least one of generate an alert and/or generate a loading recommendation (e.g., reduce a first load by 500 lbs.) when the current loading of the vehicle exceeds a threshold.

As will be discussed in greater detail below in accordance with the teachings of this disclosure, the vehicle load condition manager can have various configurations that may depend on a type of a vehicle and/or trailer coupled to the vehicle. In examples disclosed herein, these configurations can be changed or altered to ensure the vehicle load condition manager properly categorizes load data and can properly diagnose an overload condition of the vehicle and generate a proper recommendation in response to the overload condition.

Figure 1:
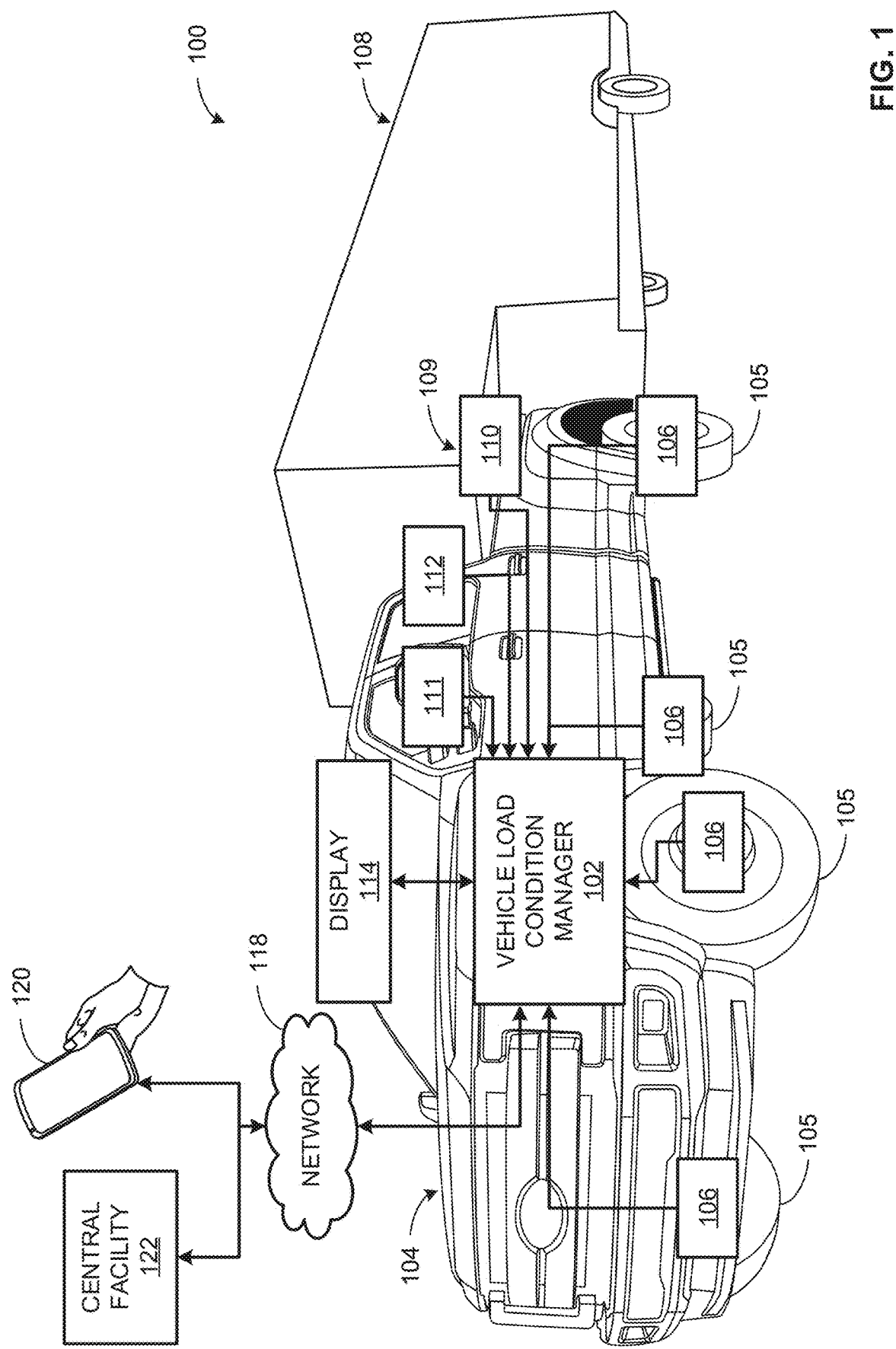
FIG. 1 illustrates an example vehicle including the vehicle load condition manager by which the examples disclosed herein can be implemented.
Figure 2:
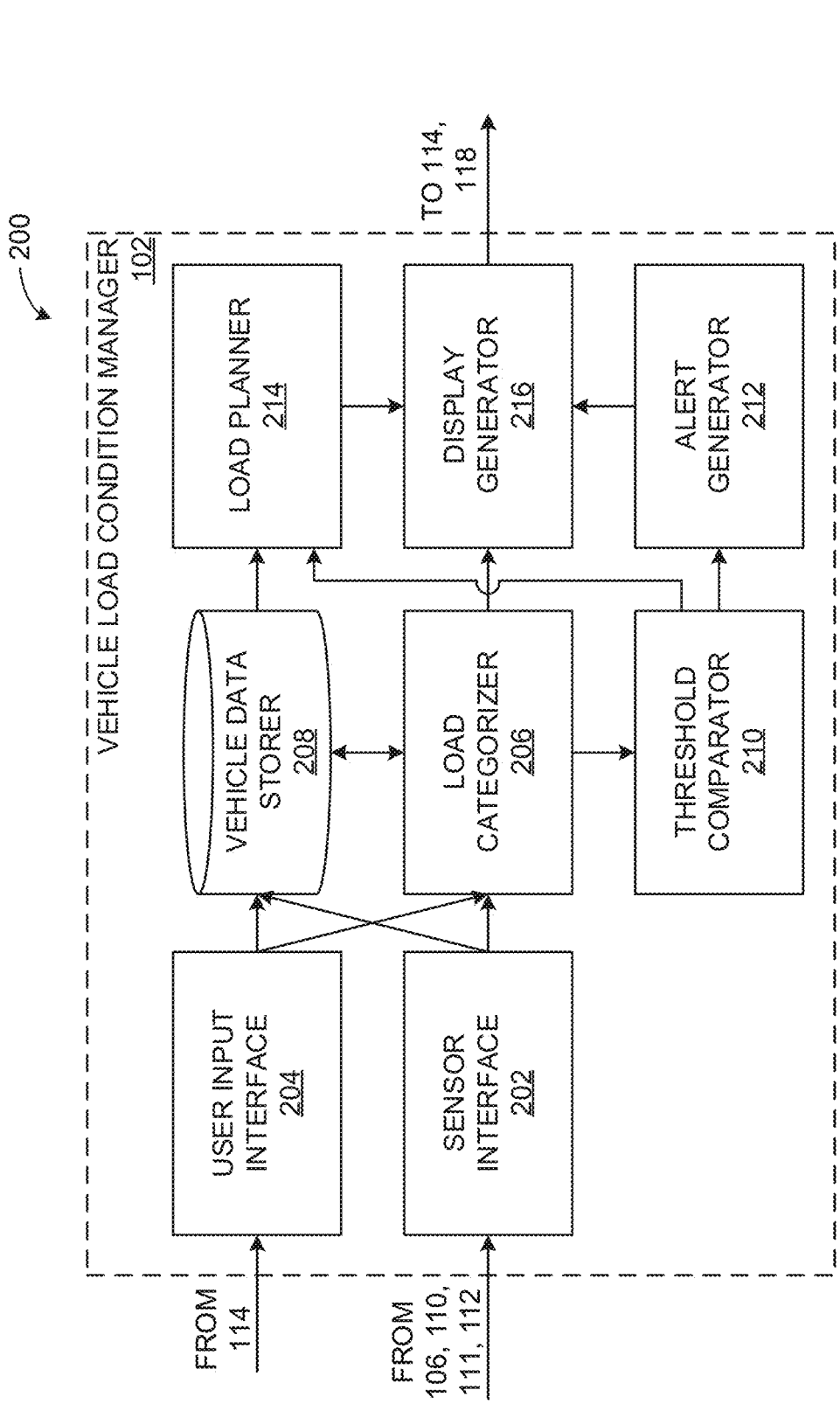
FIG. 2 is a block diagram further detailing the vehicle load condition manager of FIG. 1 by which the examples disclosed herein can be implemented.

Turning to FIG. 1, an example environment of use 100 of an example vehicle load condition manager 102, described further in conjunction with FIG. 2, includes a vehicle 104. The vehicle 104 implements or otherwise includes the vehicle load condition manager 102 to determine one or more load conditions on the vehicle 104, sort the load conditions by category and output the load conditions sorted by category for display. Further, the vehicle load condition manager 102 can additionally or alternatively determine when the summation of the load conditions exceeds a threshold and recommend a load to reduce to bring the vehicle 104 in compliance with the threshold.

The vehicle 104 further includes one or more wheel and suspension assemblies 105. In the illustrated example of FIG. 1, the vehicle 104 has four wheel and suspension assemblies 105, wherein the rear wheel and suspension assemblies 105 can be coupled via an axle and the front wheel and suspension assemblies 105 can be coupled via an axle. Additionally, one or more of the wheel and suspension assemblies 105 may include a weight sensor 106 (e.g., a load sensor). Additionally or alternatively, one or more of the axles can include the weight sensor 106 (e.g., an axle load sensor). In the illustrated example of FIG. 1, each of the wheel and suspension assemblies 105 includes a respective weight sensor 106. In some examples, the weight sensors 106 are ride height sensors, which measure suspension compression (e.g., the suspension is compressed by 8 mm, 13 inches, etc.), from which load data (e.g., loading conditions) of the vehicle 104 can be inferred (e.g., via a correlation of deflection of suspension to weight using a spring constant (stiffness) of the suspension). In yet other examples, the weight sensors 106 are transducers capable of converting load data (e.g., a load condition such as a force and/or a torque) into an electrical signal to be received by the example vehicle load condition manager 102.

Additionally or alternatively, other weight sensors 106 (e.g., load cells, accelerometers, strain gauges, etc.) and/or metrics (e.g., powertrain/engine performance, etc.) can be used to calculate the load data (e.g., loading conditions) of the vehicle 104. In some examples, loading conditions of the vehicle 104 calculated from data acquired via the weight sensors 106 can include at least load of a front axle of the vehicle 104, load of a rear axle of the vehicle 104, total load of the vehicle 104, etc. Additionally, the load data can include loads associated with at least one of vehicle cargo (e.g., building materials, furniture, etc.) stored in the vehicle 104, occupants of the vehicle 104, fuel housed in the vehicle 104, and/or an accessory (e.g., a snowplow, a fluid tank, etc.) mounted to the vehicle 104.

In the illustrated example of FIG. 1, the vehicle 104 is further capable of towing a trailer 108 coupled to the vehicle 104 by a trailer hitch 109. The trailer 108 and the contents thereof can be any weight, which can be measured by a trailer weight sensor 110. The trailer weight sensor 110, in some examples, can be integrated into the trailer hitch 109. For example, the trailer weight sensor 110 is a force sensor (e.g., a magnetoelastic force sensor, a load cell, a strain gauge, an accelerometer, etc.) capable of measuring forces and/or moments at the trailer hitch 109 coupling the trailer 108 to the vehicle 104, the forces corresponding to one or more loading conditions (e.g., total load (weight of the trailer), tongue load (downward force on the trailer hitch), etc.) of the trailer 108.

In the illustrated example of FIG. 1, the vehicle 104 further includes a fuel level sensor 111. In some examples, the fuel level sensor 111 measures a volume of fuel (e.g., 5 gallons, 12 liters, etc.) stored in a fuel tank included in the vehicle 104. For example, the fuel level sensor 111 may include of a bobber (e.g., a float) that rests on a surface of the fuel and a variable resistor with a resistance that varies relative to the position of the float. Further in such examples, the volume of fuel can be converted to a weight of fuel via a known density of the fuel used in the vehicle 104. In other examples, the fuel level sensor 111 instead can be a force sensor (e.g., a load cell, a strain gauge, etc.) capable of directly measuring the weight of the fuel in the vehicle 104.

In the illustrated example of FIG. 1, the vehicle 104 further includes one or more occupancy sensors 112. In some examples, the occupancy sensors 112 are force sensors (e.g., load cells, strain gauges, etc.) located in one or more seats of the vehicle 104 and, in such examples, directly measure a weight of an occupant of each seat of the vehicle 104. In other examples, the occupancy sensors 112 are proximity sensors that output one of a signal (e.g., a binary "1", a source voltage (5 V, 12 V, etc.), etc.) denoting a seat is occupied by a passenger or a signal (e.g., a binary "0", a ground voltage (e.g., 0 V), etc.) indicating a seat is not occupied by a passenger. In such examples, the weight of each passenger is determined based on an estimated average and/or based upon a profile of each passenger in the vehicle 104.

In some examples, the weight of the vehicle 104 and the contents thereof (e.g., the summation of cargo, occupants, fuel, and/or accessories) as measured by at least one of the weight sensor(s) 106, the fuel level sensor 111, and/or the occupant sensor(s) 112 may be less than a capacity (e.g., a gross vehicle weight rating (GVWR) defined as the weight of the vehicle 104 and the contents thereof) of the vehicle 104. Alternatively, the weight of the vehicle 104 and the contents thereof (e.g., the summation of cargo, occupants, fuel, and/or accessories) may be greater than a GVWR of the vehicle 104. For example, if the GVWR of the vehicle 104 is 5,000 lbs., the vehicle 104 and the contents thereof can be any weight less than or equal to 5,000 lbs. and greater than the curb weight (e.g., weight of the vehicle 104 when unloaded) or any weight greater than or equal to 5,000 lbs. (e.g., 5,500 lbs., 6,000 lbs., etc.), the latter resulting in an overload condition. In some examples, the overload condition may be undesirable to an owner of the vehicle 104. Additionally, the weight of the vehicle 104 and the contents thereof can vary with time. For example, if the vehicle 104 is used to transport multiple individuals, the weight of the vehicle 104 and the contents thereof may decrease or increase after an individual is dropped off or picked up, respectively.

In some examples, the weight of the trailer 108 and the contents thereof as measured by the trailer weight sensor 110 may be less than a towing capacity of the vehicle 104. Alternatively, the weight of the trailer 108 and the contents thereof may be greater than a towing capacity of the vehicle 104. For example, if the towing capacity of the vehicle 104 is 10,000 lbs., the trailer 108 and the contents thereof can be any weight less than or equal to 10,000 lbs. (e.g., 9,000 lbs., 3,000 lbs., etc.) or any weight greater than or equal to 10,000 lbs. (e.g., 11,000 lbs., 13,000 lbs., etc.), the latter resulting in an overload condition. Additionally, the weight of the trailer 108 and the contents thereof can vary with time. For example, if the vehicle 104 is used to deliver goods, the weight of the trailer 108 and the contents thereof may decrease after a delivery is complete.

The example vehicle 104 further includes an example display 114. An example interface for output on the display 114 is described further in conjunction with FIGS. 3A-3E. In some examples, the display 114 is capable of notifying a user of the vehicle 104 of parameters, data, and/or alerts from the vehicle load condition manager 102. In some examples, the display 114 can display a graphic including one or more load conditions associated with the vehicle 104 sorted by category. In other examples, the display 114 can notify the user of the vehicle 104 of an overload condition. In such examples, the display 114 can further describe actions (e.g., recommendations) the user can take to eliminate the overload condition. For example, the display 114 can recommend a reduction of the total load for one or more of the categories associated with the vehicle 104.

Additionally or alternatively, a user profile can be viewed on the display 114 and the display 114 is further capable of receiving inputs to generate and/or modify one or more profiles stored in the vehicle load condition manager 102. For example, the display 114 can receive inputs to generate and/or modify a driving profile (e.g., commuting, long distance, etc.). In other examples, the display 114 can receive inputs to generate and/or modify an accessory profile (e.g., a snowplow, a liquid tank, etc.). The display 114 may be any device capable of providing a notification to the user of the vehicle 104. For example, the display 114 may be a visual display capable of visually displaying parameters, data, and/or alerts. Additionally or alternatively, the display 114 may include an audio system capable of audibly reciting parameters, data, and/or alerts.

In the example environment of use 100, the vehicle load condition manager 102 is further connected to an example network 118. For example, the network 118 of the illustrated example of FIG. 1A is the Internet. However, the network 118 may be implemented using any suitable wired and/or wireless network(s) including, for example, one or more data buses, one or more Local Area Networks (LANs), one or more wireless LANs, one or more cellular networks, one or more private networks, one or more public networks, etc. The network 118 enables the example vehicle load condition manager 102 to be in communication with at least one of a wireless device 120 and a central facility 122. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

The wireless device 120 (in some examples, used by the owner and/or manager of the vehicle 104), is in communication with the vehicle load condition manager 102 via the network 118 and can at least one of receive one or more load conditions sorted by category for display and/or receive an alert associated with an overload condition of the vehicle 104. In such examples, the alert can additionally indicate to the user (e.g., driver) of the vehicle 104 a recommendation (e.g., reduce occupancy of the vehicle 104, reduce cargo of the vehicle 104, etc.) to remedy the overload condition. Additionally or alternatively, the wireless device 120 can receive an input to modify one or more profiles associated with the vehicle 104 (e.g., a driving profile, an accessory profile, etc.) and distribute the input to the vehicle load condition manager 102 via the network 118.

The central facility 122, in communication with the vehicle load condition manager 102 via the network 118, can store one or more alerts, loading conditions sorted by category, and/or overloading conditions received from the vehicle load condition manager 102. In some examples, the alerts, loading conditions sorted by category, and/or overloading conditions received are associated with a user (e.g., a driver) of the vehicle 104.

FIG. 2 is a block diagram of an example implementation 200 of the example vehicle load condition manager 102 of FIG. 1. The vehicle load condition manager 102 can, in some examples such as the illustrated example of FIG. 2, include an example sensor interface 202, an example user input interface 204, an example load categorizer 206, an example vehicle data storer 208, an example threshold comparator 210, an example alert generator 212, an example load planner 214, and an example display generator 216.

The sensor interface 202, included in or otherwise implemented by the vehicle load condition manager 102, is capable of receiving data from at least one of the weight sensor(s) 106, the trailer weight sensor 110, the fuel level sensor 111, and/or the occupancy sensor(s) 112. The sensor interface 202 is further capable of distributing received data to at least one of the vehicle data storer 208, and/or the load categorizer 206. For example, the sensor interface 202 may distribute load data (e.g., load conditions) from at least one of the weight sensor(s) 106, the trailer weight sensor 110, the fuel level sensor 111, and/or the occupancy sensor(s) to the vehicle data storer 208 and/or the load categorizer 206.

The user input interface 204, included in or otherwise implemented by the vehicle load condition manager 102, is capable of receiving data from the display 114. The user input interface 204 is further capable of distributing received data to at least one of the vehicle data storer 208, and/or the load categorizer 206. For example, the user input interface 204 may distribute load data (e.g., load conditions) and/or load profiles as input to the display 114 by a user of the vehicle 104 to the vehicle data storer 208 and/or the load categorizer 206.

The example load categorizer 206, included in or otherwise implemented by the vehicle load condition manager 102, is capable of sorting load data received from one of the sensor interface 202 and/or the user input interface 204 by category. In some examples, the load categories include at least one of a cargo category (e.g., building materials, furniture, etc.), an occupant category (e.g., people in a cabin of the vehicle 104), a fuel category, an accessory category (e.g., a snowplow, a liquid tank, a salt spreader, etc.), and/or a trailer category (e.g., a towed storage trailer, a towed boat, etc.). Further in such examples, received load data is categorized based upon a source of the data.

For example, data received at the sensor interface 202 from the trailer weight sensor 110 is determined to be load data categorized in the trailer category. Additionally, data received at the sensor interface 202 from the fuel level sensor 111 is determined to be load data categorized in the fuel category. Additionally, data received at the sensor interface 202 from the occupancy sensor(s) 112 is determined to be load data categorized in the occupant category. Additionally, data received at the user input interface 204 from a user interface associated with the display 114 can be categorized in at least one of the occupant or the accessory category, dependent upon the input.

Having defined all load categories except for the cargo category, it is now possible to calculate load data falling the cargo category based upon load data from the weight sensor(s) 106, the empty load of the vehicle 104, and the loads associated with remaining categories that are located in the vehicle 104 (e.g., occupant category, fuel category, accessory category, etc.). In such an example, the load data associated with the cargo category can be calculated based upon subtracting the remaining category load data and the empty weight of the vehicle 104 from the load data associated with the weight sensor(s) 1056.

In response to categorization of load data associated with the vehicle 104, the load categorizer 206 is further to distribute the loads to at least one of the example vehicle data storer 208, the example threshold comparator 210, and/or the example load planner 214.

The example vehicle data storer 208, included in or otherwise implemented by the vehicle load condition manager 102, is capable of storing one or more driving profiles (e.g., commute, long distance, etc.) and/or accessory profiles (e.g., snowplow, fluid tank, etc.) associated with the vehicle 104, load data associated with the vehicle 104 from one or more of the weight sensor(s) 106, the fuel level sensor 111, and/or the occupancy sensor(s) 112, load data of the trailer 108 from the trailer weight sensor 110 coupled to the vehicle 104, and/or categorized (e.g., sorted) load data as received from the load categorizer 206. The vehicle data storer 208 may be implemented by a volatile memory (e.g., a Synchronous Dynamic Random-Access Memory (SDRAM), Dynamic Random Access Memory (DRAM), RAMBUS Dynamic Random Access Memory (RDRAM), etc.) and/or a non-volatile memory (e.g., flash memory). The vehicle data storer 208 may additionally or alternatively be implemented by one or more double data rate (DDR) memories, such as DDR, DDR2, DDR3, mobile DDR (mDDR), etc. The vehicle data storer 208 may additionally or alternatively be implemented by one or more mass storage devices such as hard disk drive(s), compact disk drive(s), digital versatile disk drive(s), etc. While in the illustrated example the vehicle data storer 208 is illustrated as a single database, the vehicle data storer 208 may be implemented by any number and/or type(s) of databases. Further, the vehicle data storer 208 may be located in the vehicle 104 or at a central location outside of the vehicle 104. For example, the vehicle data storer 208 can be located at the example central facility 122 of FIG. 1. Furthermore, the data stored in the vehicle data storer 208 may be in any data format such as, for example, binary data, comma delimited data, tab delimited data, structured query language (SQL) structures, etc.

The example threshold comparator 210, included in or otherwise implemented by the vehicle load condition manager 102, receives one or more loading conditions (e.g., load data) of the vehicle(s) 104 from the example load categorizer 206 and an identity of the user of the vehicle 104 from the sensor interface 202. Additionally, the threshold comparator 210 queries the vehicle data storer 208, the query to retrieve one or more load data limits (e.g., front axle load limited to 1,500 lbs., trailer load limited to 3,000 lbs., etc.) stored in the vehicle data storer 208 in association with the vehicle 104.

In response to completing the retrieval of one or more loading condition limits (e.g., threshold) for the identified user of the vehicle 104, the threshold comparator 210 compares loading data received from the load categorizer 206 to the loading data limits retrieved from the vehicle data storer 208. The threshold comparator 210, in some examples, determines whether one or more loading conditions satisfies a corresponding threshold.

In some examples, the threshold is a lower limit and the loading condition satisfies the threshold when the loading condition is less than the threshold (e.g., a minimum weight of the vehicle 104 is 2,500 lbs.; any load less than 2,500 lbs. satisfies the threshold). In other examples, the threshold is an upper limit and the loading condition satisfies the threshold when the loading condition is greater than the threshold (e.g., a maximum weight of the trailer 108 is 3,000 lbs.; any load greater than 3,000 lbs. satisfies the threshold). In response to determining one or more loading conditions satisfies the corresponding threshold, the threshold comparator 210 is further to distribute a notification to the alert generator 212.

The example alert generator 212, included in or otherwise implemented by the vehicle load condition manager 102, is capable of receiving the threshold satisfaction notification from the threshold comparator 210 and propagating the notification in the form of an overload warning to the display generator 216.

The example load planner 214, included in or otherwise implemented by the vehicle load condition manager 102, can generate one or more loading recommendations for a user of the vehicle 104 based upon a comparison of a current loading of the vehicle 104 to a threshold loading as received from the threshold comparator 210. In some examples, the loading recommendations are further based upon one or more parameters and/or predicted parameters of the vehicle 104 (in some examples, determined based on a current driving profile of the vehicle 104).

Additionally or alternatively, the loading recommendations are further based upon a programmed trip (e.g., a length of trip, a destination, a start point, etc.) of the vehicle 104 (in some examples, determined based upon a Global Positioning System (GPS) based navigation system included in the vehicle). In some examples, the trip can additionally or alternatively be determined based upon a schedule of a user of the vehicle 104. In such examples, the schedule of the user of the vehicle 104 can be determined by a calendar (e.g., Microsoft® Outlook, Google® Calendar, iCloud® Calendar, etc.) of the user of the vehicle 104 including one or more appointments and associated locations. In some examples, the calendar can be retrieved from the wireless device 120 via the network 118. In other examples, the schedule of the user of the vehicle 104 can be determined by the load planner 214 based upon historical driving data of the vehicle 104 (e.g., the vehicle 104 is driven on weekday mornings (commuting to work), the vehicle 104 is driven on weekday evenings (commuting from work), etc.).

In some examples, the loading recommendation is based upon a load category with a lowest rated importance based on the parameters and/or programmed trip of the vehicle 104. For example, the current profile of the vehicle 104 can be "long distance." In such an example, the load planner 214 ranks load data associated with fuel first due to the need to power the vehicle 104 for the duration of the trip. In another example, the current profile of the vehicle 104 can be "commuting." In such an example, the load planner 214 ranks load data associated with occupants required to arrive at work first.

Additionally, when a summation of loads associated with the vehicle 104 exceeds a threshold, based on a difference between the summation of the received load data and the threshold retrieved from the vehicle data storer 208, calculated by the threshold comparator 210, the load planner 214 can generate a recommendation to reduce the bottom (e.g., last) ranked load category by a quantity equal to the difference. Further, in such an example, the load planner 214 can transmit the recommendation to the example display generator 216.

In yet other examples, when a summation of loads associated with the vehicle 104 does not exceed a threshold, based on a difference between the summation of the received load data and the threshold retrieved from the vehicle data storer 208, calculated by the threshold comparator 210, the load planner 214 can generate a recommendation including how much weight in one or more load categories can be added until the summation of loads matches the threshold. For example, if the summation of load data is 200 lbs. less than the threshold, the load planner 214 can generate a recommendation that 50 lbs. of fuel and a 150 lb. occupant can be added to the vehicle 104. Additionally or alternatively, the load planner 214 can generate a recommendation that 200 lbs. of cargo can be added to the vehicle 104. Further, the load planner 214 can recommend any combination of loads until the summation of loads associated with the vehicle 104 matches a threshold. In each example, the load planner 214 can transmit the recommendation to the example display generator 216.

The example display generator 216, included in or otherwise implemented by the vehicle load condition manager 102, is capable of receiving and/or distributing load data sorted by category from the load categorizer 206, one or more overload warnings from the alert generator 212, and/or one or more recommendations from the load planner 214 to at least one of the display 114 and/or the network 118, the network 118 to further propagate the notification to at least one of the wireless device 120 and/or the central facility 122. In some examples, the display generator 216 modifies received data to be in a format readable on at least one of the display 114 and/or the wireless device 120.

While an example manner of implementing the vehicle load condition manager 102 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor interface 202, the example user input interface 204, the example load categorizer 206, the example threshold comparator 210, the example alert generator 212, the example load planner 214, the example display generator 216 and/or, more generally, the example vehicle load condition manager 102 of FIG. 2 may be implemented by hardware, software, firmware and/or any combination of hardware, software and/or firmware. Thus, for example, any of the example sensor interface 202, the example user input interface 204, the example load categorizer 206, the example threshold comparator 210, the example alert generator 212, the example load planner 214, the example display generator 216 and/or, more generally, the example vehicle load condition manager 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 202, the example user input interface 204, the example load categorizer 206, the example threshold comparator 210, the example alert generator 212, the example load planner 214, and/or the example display generator 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example vehicle load condition manager 102 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
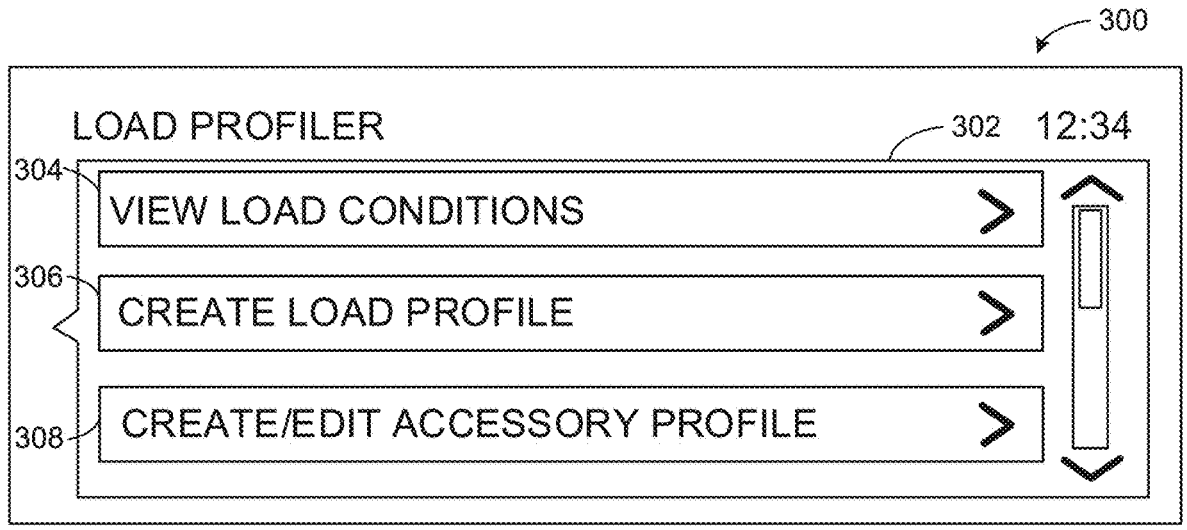
FIGS. 3A-3E are example interfaces by which a user can input and/or edit profiles utilized by the vehicle load condition manager and/or can display outputs of the vehicle load condition manager.
Figure 3B:
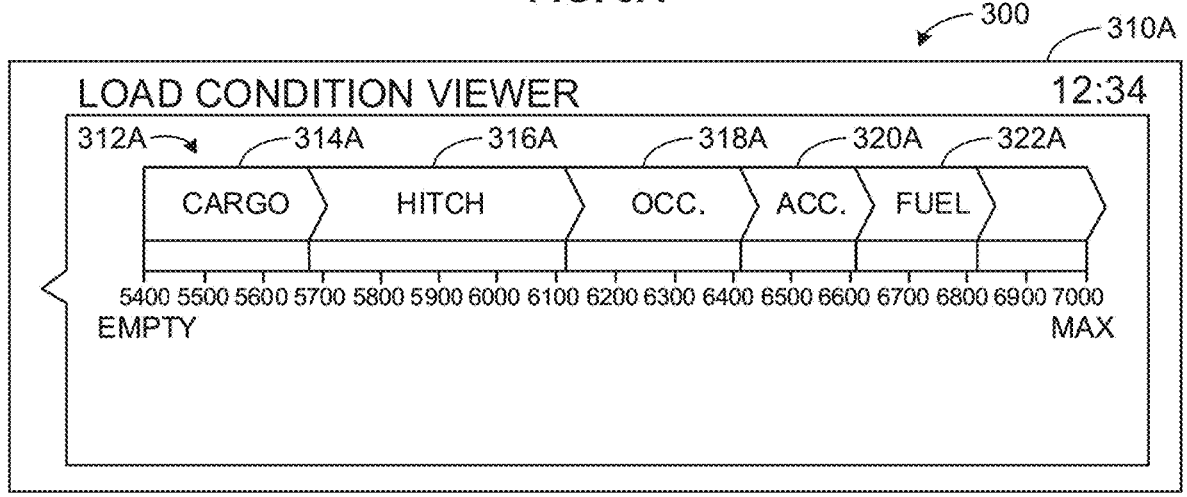
Figure 3C:
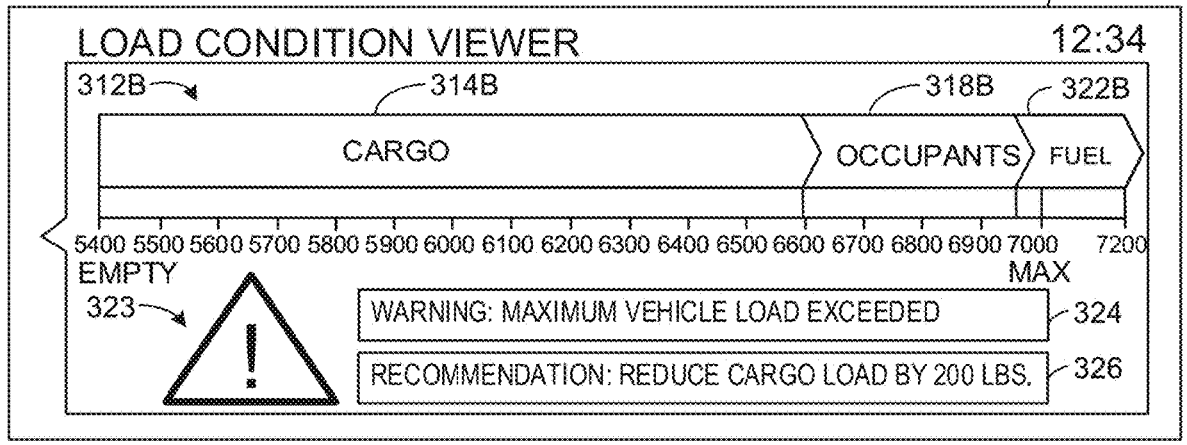
Figure 3D:
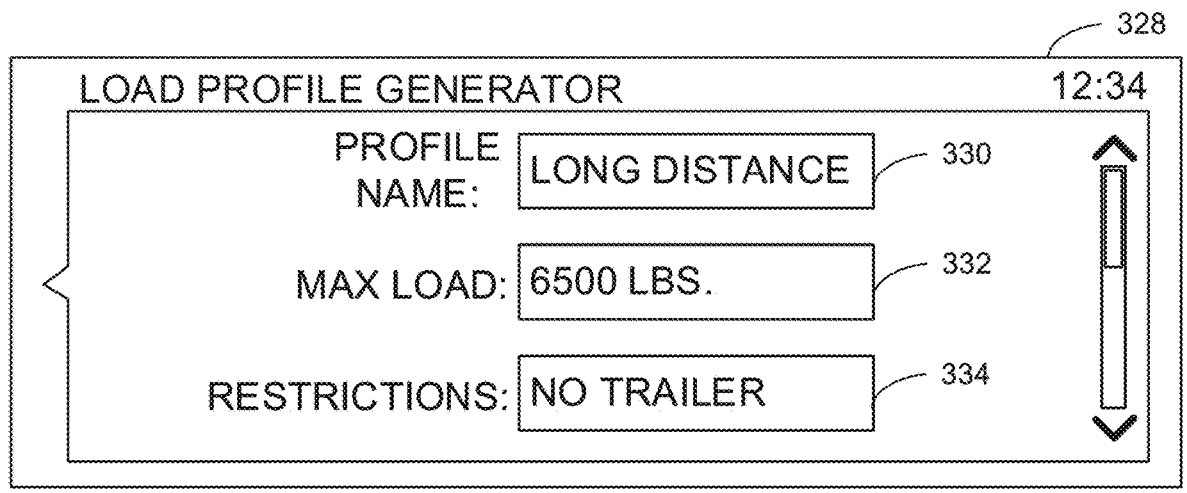
Figure 3E:
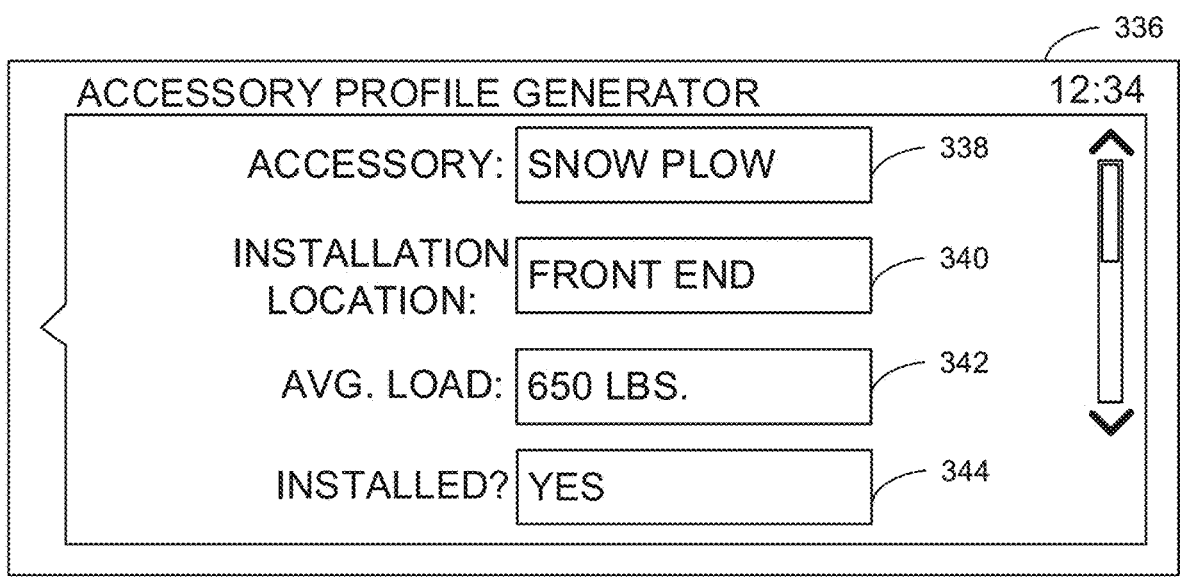

FIGS. 3A and 3E illustrate an example interface 300 that can be displayed by the display 114 included in the vehicle 104 of FIG. 1. For example, a first screen 302 of the interface 300 allows a user of the vehicle 104 to at least one of view current load data associated with the vehicle 104 sorted by category (e.g., cargo, occupants, fuel, trailer, accessory, etc.) by selecting a view field 304, create a load profile for a driving mode of the vehicle 104 (e.g., commute, long distance, etc.) by selecting a create load profile field 306, and/or create a profile for an accessory mounted to the vehicle 104 (e.g., a snowplow, fluid tank, etc.) by selecting a create accessory profile field 308. In response to selection of the view field 304, the interface 300 navigates to one of a second screen 310A or a third screen 310B.

The second screen 310A displays a load categorization graphic 312A. In the illustrated example of FIG. 3B, the load categorization graphic 312A includes one or more portions of load data, sorted by category by the example load categorizer 206 of FIG. 2, orientated from left to right. Additionally, the load categorization graphic 312A includes an empty load condition (5,400 lbs.) of the vehicle 104 based upon a known weight of the vehicle 104 as stored by the vehicle data storer 208 and a maximum load condition (7,000 lbs.) of the vehicle 104 based upon a known threshold loading of the vehicle 104. In the illustrated example of FIG. 3B, the load categorization graphic 312A further includes categorized load data including a cargo category 314A (totaling approximately 250 lbs.), a hitch category 316A (e.g., a trailer category, totaling approximately 500 lbs.), an occupant category 318A (totaling approximately 300 lbs.), an accessories category 320A (totaling approximately 300 lbs.), and a fuel category 322A (totaling approximately 200 lbs.). Thus, the total weight of the vehicle 104 and the loads associated with the vehicle 104 (e.g., the cargo load, occupant load, and fuel load) is approximately equal to 6,800 lbs. (200 lbs. less than the recommended threshold of the vehicle 104).

The screen 310B displays a load categorization graphic 312B, the formatting of which is similar to the load categorization graphic 312A. In the illustrated example of FIG. 3C, the load categorization graphic 312B further displays load data associated with the vehicle 104 that has been categorized by the load categorizer 206 of FIG. 2 into a cargo category 314B (totaling approximately 1,200 lbs.), an occupant category 318B (totaling approximately 400 lbs.) and a fuel category 322B (totaling approximately 200 lbs.). Thus, the total weight of the vehicle 104 and the loads associated with the vehicle 104 (e.g., the cargo load, occupant load, and fuel load) is approximately equal to 7,200 lbs. (200 lbs. greater than the recommended threshold of the vehicle 104).

In some examples, as illustrated in the third screen 310B, a warning 323 can be displayed when a summation of load data associated with the vehicle 104 exceeds a threshold. In some examples, the warning 323 further includes a description field 324 displaying the current warning condition ("Maximum vehicle load exceeded" in the illustrated example of FIG. 3C). In the illustrated example of FIG. 3C, the current summation of load data associated with the vehicle 104 is 7,200 lbs. and the maximum load of the vehicle 104 is 7,000 lbs. (each of these values displayed by the load categorization graphic 312B). The difference between these values is further displayed by a recommendation field 326, which displays a recommendation for the user of the vehicle 104 ("Reduce cargo load by 200 lbs." in the illustrated example of FIG. 3C). In some examples, the load displayed by the load categorization graphic 312B updates dynamically and displays a substantially current value of the load, assisting (e.g., prompting) the user of the vehicle 104 to reduce (or increase) the load to be compliant with the threshold load value.

A fourth screen 328, displayed in response to selection of the create load profile field 306 of the first screen 302, displays additional detail about the vehicle profile "Long Distance," as denoted by a profile name field 330. In some examples such as the illustrated example of FIG. 3D, the additional details include a maximum load field 332 and a restriction field 334. For example, as entered into the max load field 332, the profile for "Long distance" is set such that the maximum load of the vehicle 104 is "6,500 lbs." Additionally, as entered into the restriction field 334, the profile for "Long distance" is set such that the trailer 108 is not to be towed by the vehicle 104 (e.g., "No trailer") when in the "Long distance" mode. Additionally, any of one of the profile name field 330, the maximum load field 332, and/or the restriction field 334 can be modified and/or changed by a user of the vehicle 104 via an input to the display 114.

A fifth screen 336, displayed in response to selection of the create accessory profile field 308 of the first screen 302, displays additional detail about an accessory profile "Snowplow," as denoted by an accessory field 338. In some examples such as the illustrated example of FIG. 3E, additional details displayed include the installation location of the accessory, an average load (e.g., load data, load parameter, etc.) associated with the accessory, and an installation status of the accessory. For example, as entered into an install location field 340, the profile for "Snowplow" is set such that the snowplow accessory, when mounted to the vehicle 104, is mounted to the "Front End" of the vehicle 104. Additionally, as entered into an average load field 342, the profile for "Snowplow" is set such that an average load of the Snowplow is "650 lbs." Additionally, as entered into an installed query field 344, the profile for "Snowplow" is set such the Snowplow is currently installed (e.g., "Yes") on the vehicle 104. Additionally, any of one of the accessory field 338, the install location field 340, the average load field 342, and/or the installed query field 344 can be modified and/or changed by a user of the vehicle 104 via in input to the display 114.

Figure 4:
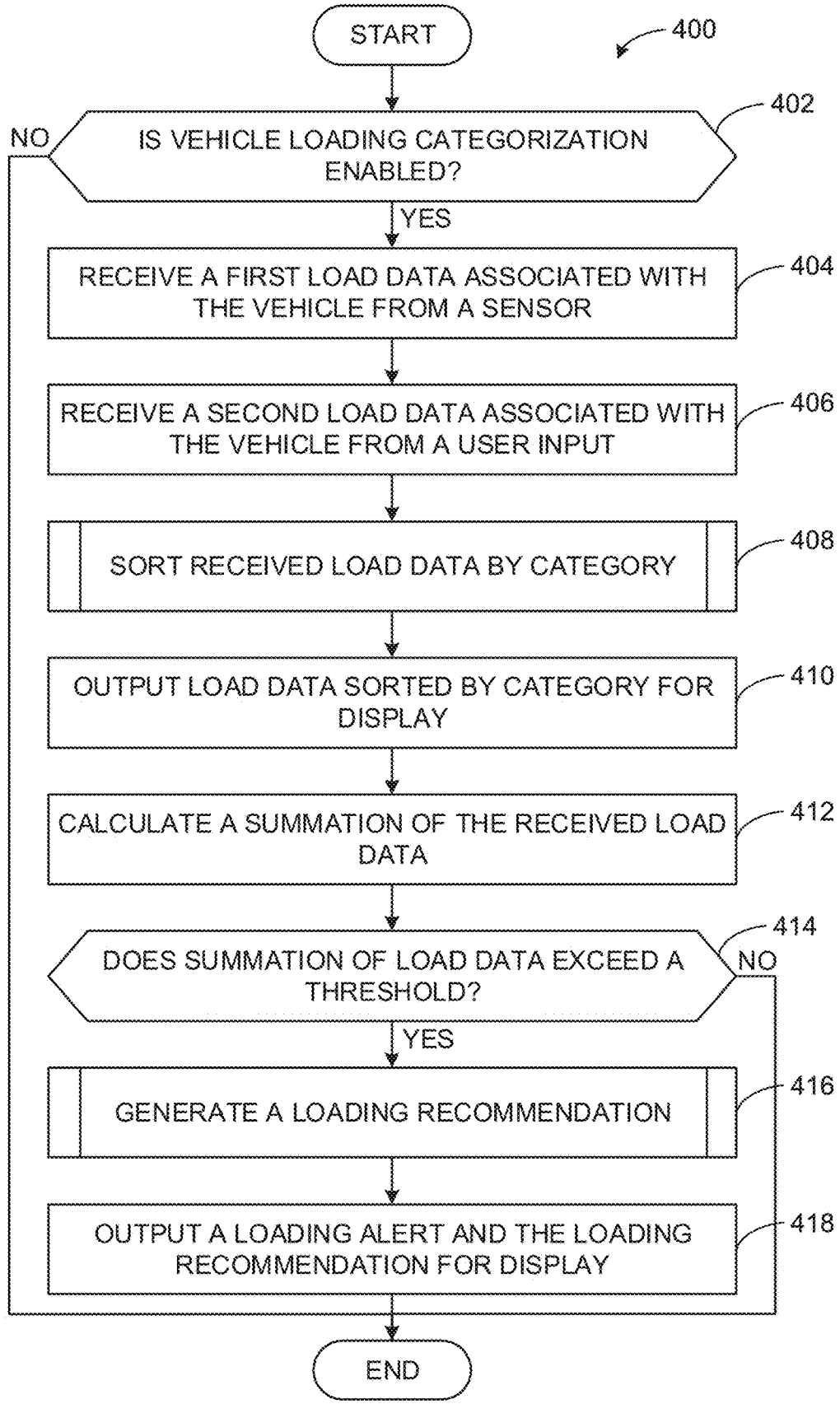
FIGS. 4-6 are flowcharts representative of example methods that may be performed using the vehicle load condition manager of FIGS. 1, and/or 2 to modify a vehicle feature based upon a loading condition.
Figure 5A:
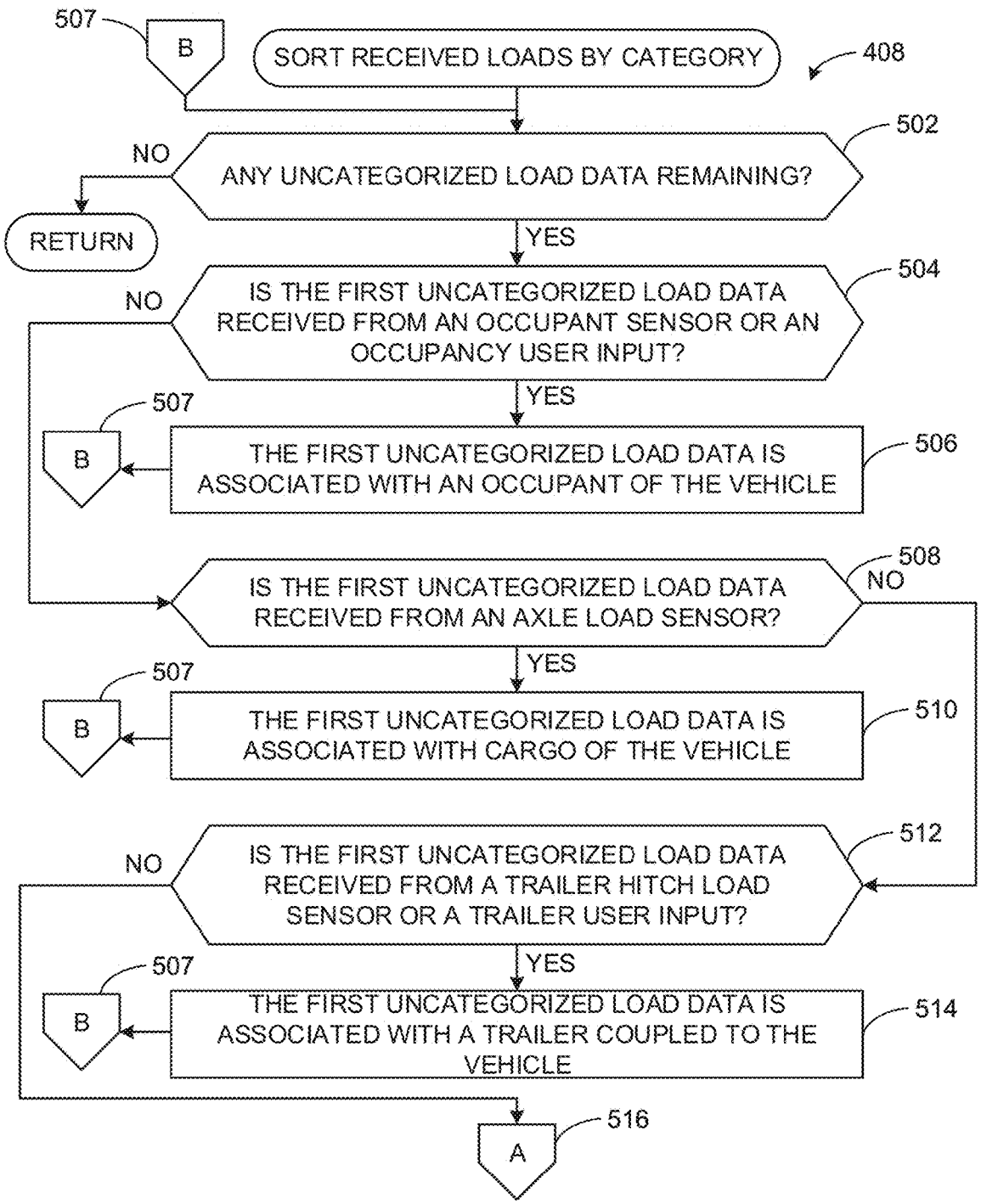
Figure 5B:
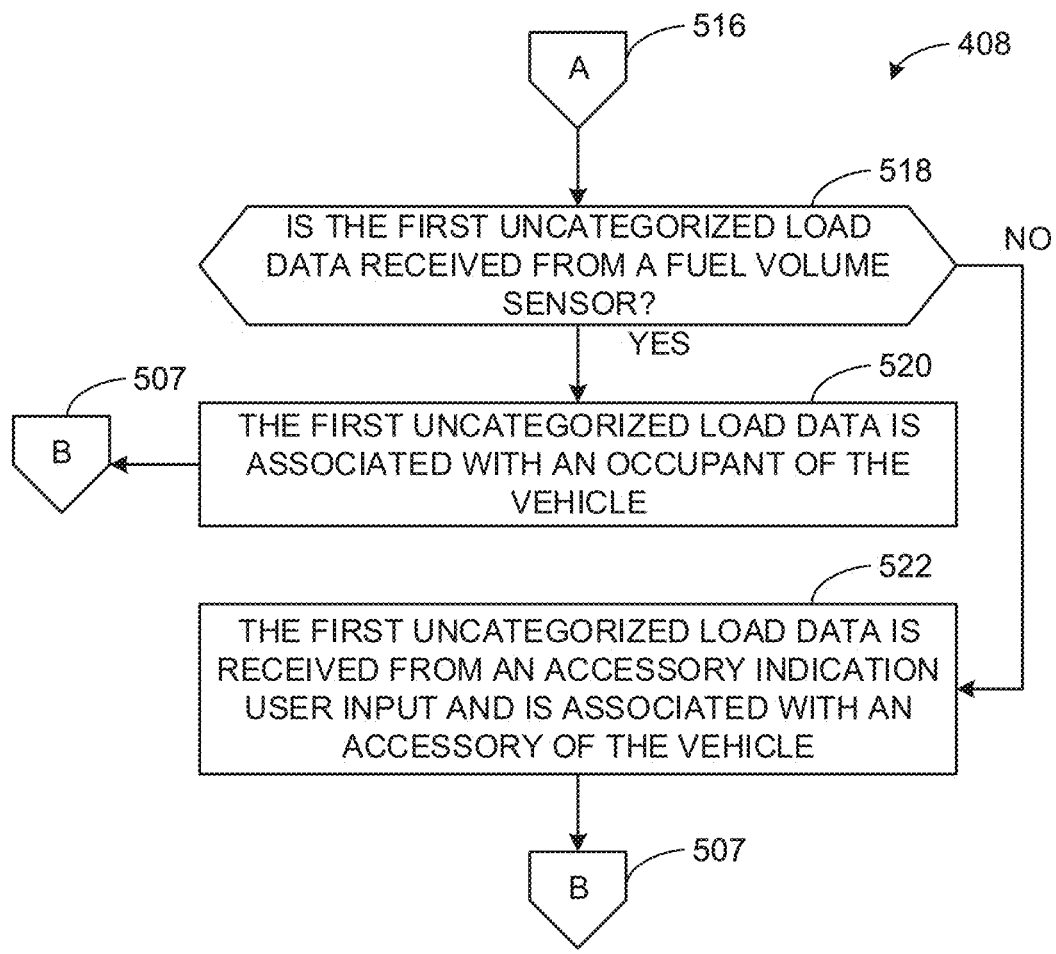
Figure 6:
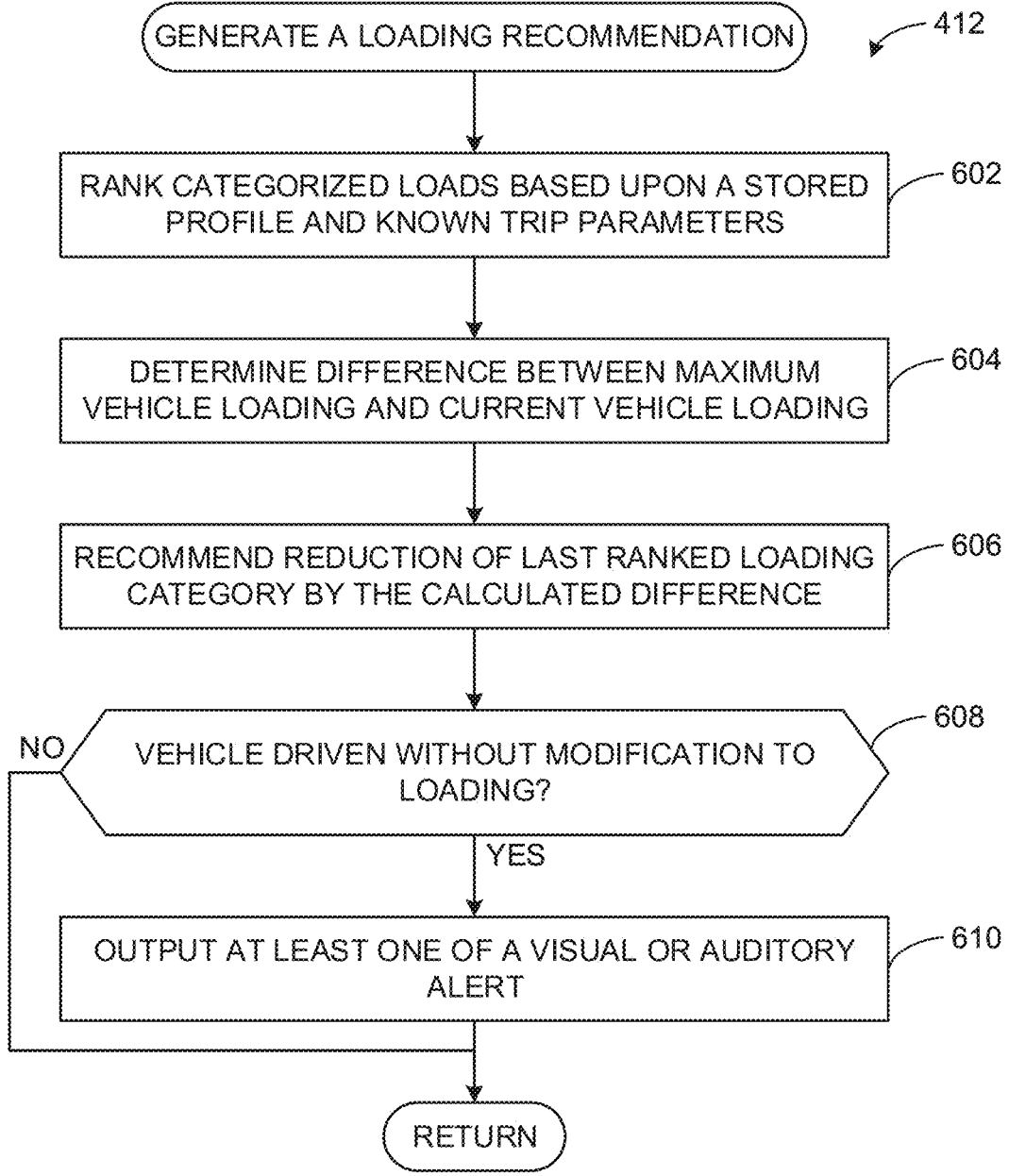

Flowcharts representative of example hardware logic, machine readable instructions, hardware implemented state machines, and/or any combination thereof for implementing the vehicle load condition manager 102 of FIG. 2 are shown in FIGS. 4-6. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 4-6, many other methods of implementing the example vehicle load condition manager 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The example method 400 of FIG. 4 begins at block 402. At block 402, the example vehicle load condition manager 102 determines whether vehicle load categorization is enabled for the vehicle 104. In response to determining load categorization is enabled, processing proceeds to block 404. Alternatively, in response to determining load categorization is not enabled, the example method 400 of FIG. 4 ends.

At block 404, the sensor interface 202 receives at least first load data from one of the weight sensor(s) 106, the trailer weight sensor 110, the fuel level sensor 111, and/or the occupancy sensor(s) 112. In some examples, the sensor interface 202 is further to convert the load data received into a format (e.g., a digital signal, a bit based value, etc.) processable by the vehicle load condition manager 102. In response to receiving at least the first load data, processing proceeds to block 406.

At block 406, the user input interface 204 receives at least second load data from a user input to the display 114. For example, the user input can include load data associated with an accessory mounted to the vehicle 104. In other examples, the user input can include load data associated with an occupant of the vehicle 104. In response to receiving at least the second load data, processing proceeds to block 408.

At block 408, described further in conjunction with FIGS. 5A-5B, the load categorizer 206 sorts the received load data (e.g., at least the first load data received at block 404 and the second load data received at block 406) by category (e.g., cargo, occupants, trailer, accessory, fuel, etc.). In response to the categorization of each load received, processing proceeds to block 410.

At block 410, the display generator 216 receives the categorized load data from the load categorizer 206. Based on the categorized load data, the display generator 216 is further to generate a graphic including the load data sorted by category and transmit the graphic for display by the display 114. For example, the graphic including the load data transmitting to the display can be one of the load categorization graphic 312A, 312B described further in conjunction with FIG. 3B-3C. In response to the transmission of the graphic to the display 114, processing proceeds to block 412.

At block 412, the threshold comparator 210 calculates a summation of the load data received at blocks 404 and 406. For example, the threshold comparator 210 sums (e.g., adds) at least the first load data and the second load data. In response to completion of the summation of load data, processing proceeds to block 414.

At block 414, the threshold comparator 210 is further to compare the summation of the load data to a threshold (e.g., a maximum weight of the contents of the vehicle 104). In some examples, the threshold is based upon a parameter of the vehicle 104 and is stored in the example vehicle data storer 208. In response to the summation exceeding the threshold, processing proceeds to block 416. Alternatively, in response to the summation not exceeding the threshold, the example method 400 of FIG. 4 ends.

At block 416, described further in conjunction with FIG. 6, the load planner 214 generates a loading recommendation (e.g., a recommendation to recede and/or increase one or more loads associated with the vehicle 104. In response to the generation of the recommendation, processing proceeds to block 418.

At block 418, the display generator 216 receives the recommendation from the load planner 214 and the display generator 216 is further to generate a graphic including the load data sorted by category and transmit the graphic to the display 114. For example, the graphic including the load data transmitting to the display can be the recommendation field 326 described further in conjunction with FIG. 3C. In response to the transmission of the recommendation graphic to the display 114, the example method 400 of FIG. 4 ends.

An example method that may be executed to sort received loads by category (FIG. 4, block 408) utilizing the example load categorizer 206 is illustrated in FIGS. 5A-5B. With reference to the preceding figures and associated descriptions, the example method of FIGS. 5A-5B begins execution at block 502 at which the load categorizer 206 determines whether any load data remains uncategorized. In response to determining one or more loads remain uncategorized, processing proceeds to block 504. Alternatively, in response to determining all load data is categorized, the example method 408 of FIG. 5 end and processing returns to block 410 of the example method 400 of FIG. 4.

At block 504, the load categorizer 206 determines whether the first uncategorized load data, received from one of the sensor interface 202 or the user input interface 204, is related to an occupancy load (e.g., the load received from one of the occupancy sensor(s) 112 and/or an occupancy input to the display 114). In response to determining the load is related to the occupancy load, processing proceeds to block 506 at which the load categorizer 206 denotes the load data as such and, in some examples, distributes the load data with a reference to the occupancy category to the vehicle data storer 208 for storage and processing proceeds to block 502 via block 507. Conversely, in response to determining the load data is not associated with an occupancy load, processing proceeds to block 508.

At block 508, the load categorizer 206 determines whether the first uncategorized load data, received from one of the sensor interface 202 or the user input interface 204, is related to a cargo load (e.g., the load received from one of the weight sensor(s) 106 coupled to one of the wheels and suspension assemblies 105 of the vehicle 104 and/or one or more axles of the vehicle 104). In response to determining the load data is related to the cargo load, processing proceeds to block 510 at which the load categorizer 206 denotes the load data as such and, in some examples, distributes the load data with a reference to the cargo category to the vehicle data storer 208 for storage and processing proceeds to block 502 via block 507. Conversely, in response to determining the load data is not associated with a cargo load, processing proceeds to block 512.

At block 512, the load categorizer 206 determines whether the first uncategorized load data, received from one of the sensor interface 202 or the user input interface 204, is related to a trailer load (e.g., the load received from one of the trailer weight sensor 110 and/or a trailer attached input to the display 114). In response to determining the load data is related to the trailer load, processing proceeds to block 514 at which the load categorizer 206 denotes the load data as such and, in some examples, distributes the load data with a reference to the trailer category to the vehicle data storer 208 for storage and processing proceeds to block 502 via block 507. Conversely, in response to determining the load data is not associated with a trailer load, processing proceeds to block 518 via block 516.

At block 518, the load categorizer 206 determines whether the first uncategorized load data, received from one of the sensor interface 202 or the user input interface 204, is related to a fuel load (e.g., the load data received from the fuel level sensor 111). In response to determining the load is related to the fuel load, processing proceeds to block 520 at which the load categorizer 206 denotes the load data as such and, in some examples, distributes the load data with a reference to the fuel category to the vehicle data storer 208 for storage and processing proceeds to block 502 via block 507. Conversely, in response to determining the load data is not associated with a trailer load, processing proceeds to block 522.

At block 522, the load categorizer 206 determines that the first uncategorized load data, received from one of the sensor interface 202 or the user input interface 204, is related to an accessory load (e.g., the load received from an input to the display 114 via the create accessory profile field 308, for example) and, in some examples, distributes the load data with a reference to the fuel category to the vehicle data storer 208 for storage and processing proceeds to block 502 via block 507.

An example method that may be executed to generate a loading recommendation (FIG. 4, block 412) utilizing the example vehicle load condition manager 102 is illustrated in FIG. 6. With reference to the preceding figures and associated descriptions, the example method of FIG. 6 begins execution at block 602 at which the load planner 214 ranks the categorized loads based upon a stored profile and one or more known trip parameters. For example, the current profile of the vehicle 104 can be "long distance." In such an example, load data associated with fuel is ranked first due to the need to power the vehicle 104 for the duration of the trip. In another example, the current profile of the vehicle 104 can be "commuting." In such an example, load data associated with occupants required to arrive at work is ranked first. In response to the ranking of one or more categories of load data, processing proceeds to block 604.

At block 604, the threshold comparator 210 determines a difference between the summation of the received load data previously calculated at block 412 of the example method 400 of FIG. 4 and a threshold retrieved from the vehicle data storer 208. In some examples, the difference is calculated based upon subtracting the threshold from the summation of the received load data. In response to completing the calculation of the difference, processing proceeds to block 606, at which the load planner 214 generates a recommendation to reduce the bottom (e.g., last) ranked load category by a quantity equal to the difference calculated at block 604. Further at block 606, in some examples, the display generator 216 transmits the generated recommendation for display by the display 114.

At block 608, the vehicle load condition manager 102 determines whether the vehicle 104 is driven without modification to the loading as recommended by the recommendation generated at block 606. In response to determining the loading has not been modified, processing proceeds to block 610. Alternatively, in response to determining the recommendation is satisfied, the example method 412 of FIG. 6 ends and processing returns to block 414 of the example method 400 of FIG. 4.

At block 610, in response to determining the vehicle 104 is driven without modification, the display generator 216 outputs additional display data to instruct the display 114 to further output at least one of an additional visual alert and/or an auditory alert via an audio system included in the display 114. In response to the output of an additional alert, the example method 412 of FIG. 6 ends and processing returns to block 414 of the example method 400 of FIG. 4.

Figure 7:
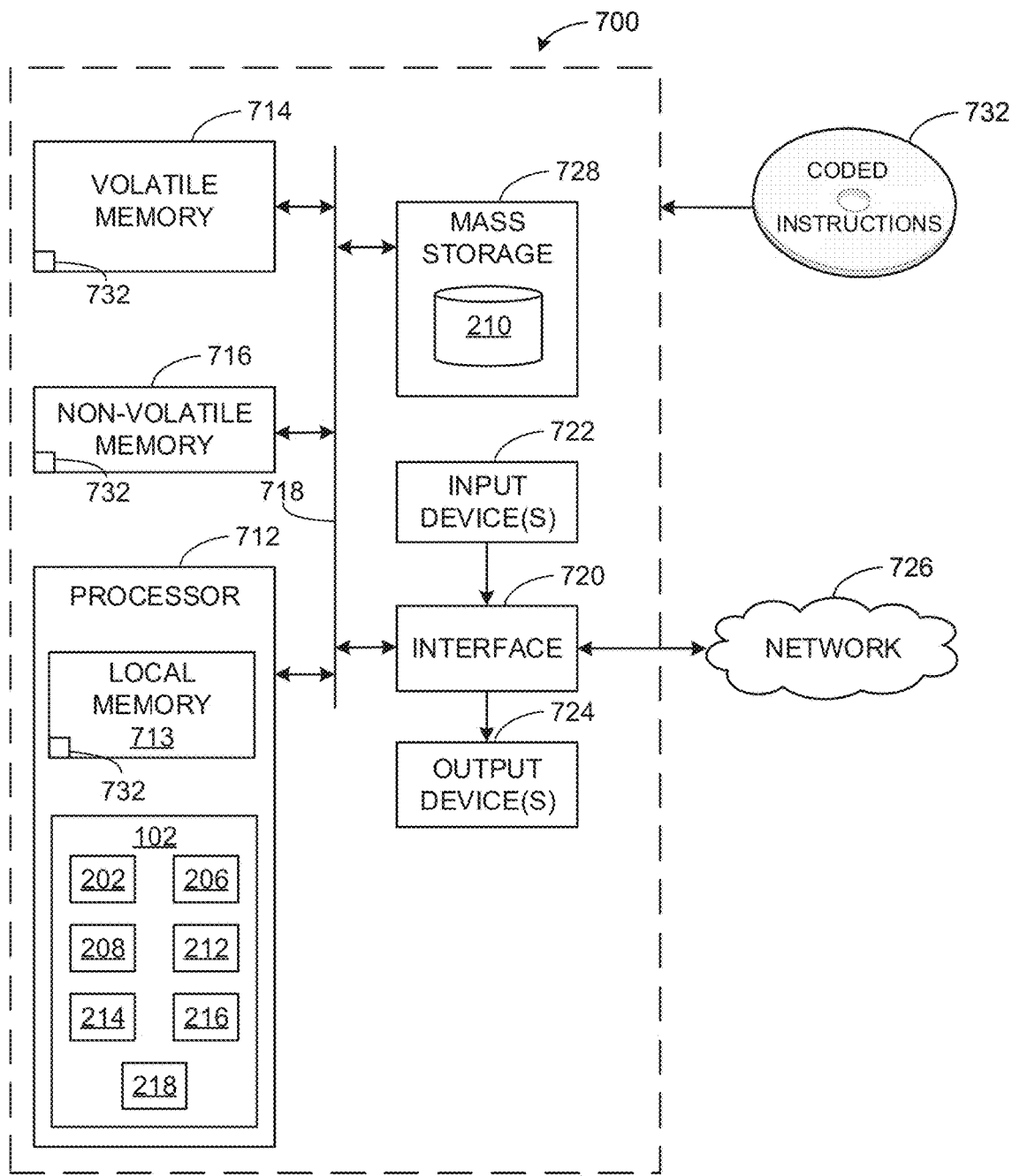
FIG. 7 is a block diagram of an example processing platform structured to execute machine readable instructions to implement the methods of FIGS. 4-6 and the example vehicle load condition manager of FIGS. 1A, 1B, and/or 2.

FIG. 7 is a block diagram of an example processor platform 700 structured to execute the instructions of FIGS. 4-6 to implement the vehicle load condition manager 102 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor interface 202, the example user input interface 204, the example load categorizer 206, the example threshold comparator 210, the example alert generator 212, the example load planner 214, and the example display generator 216.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random-Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 4-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that categorize load data received from at least one of a sensor associated with a vehicle and/or a user interface of a display associated with a vehicle. In some examples, the categorized load data is summed and compared to a threshold. When the sum exceeds the threshold, a recommendation to reduce one or more of the load categories can be displayed, the reduction of the load to below the threshold to promote reliability and operability of the vehicle.

Example 1 includes a method, comprising comparing a summation of first load data and second load data to a threshold, the first or second load data associated with input from a vehicle sensor or a user interface, sorting the first and second load data into one or more categories, each of the categories based on input associated with the first load data or the second load data, the load data including vehicle load data or external vehicle load data, and displaying the sorted load data.

Example 2 includes the method of Example 1, wherein the sensor includes at least one of an occupant sensor, an axle load sensor, a trailer weight sensor, or a fuel level sensor.

Example 3 includes the method of Example 1, wherein the one or more categories include at least one of a vehicle cargo category, an occupants category, a fuel category, an accessories category, or a trailer category.

Example 4 includes the method of Example 1, further including receiving, via the user interface, an input indicating at least one of an accessory mounted to the vehicle, an occupancy of the vehicle, or a trailer coupled to the vehicle.

Example 5 includes the method of Example 4, further including receiving, via the user interface, an input including a load parameter of the accessory.

Example 6 includes the method of Example 1, further including generating a recommendation for display via the user interface, the recommendation to recommend decreasing at least one of a first or second load such that the summation does not exceed the threshold.

Example 7 includes the method of Example 6, further including generating the recommendation based on a vehicle profile or a trip parameter used to rank the first and second load, the ranking to determine whether to recommend decreasing the first or the second load.

Example 8 includes the method of Example 7, wherein the trip parameter is based upon at least one of a length of trip or a destination determined by at least one of a navigation system of the vehicle or a schedule associated with a user of the vehicle.

Example 9 includes a method, comprising categorizing first load data and second load data associated with a vehicle into one or more categories, each of the categories based on sensor input associated with the first load data or user input associated with the second load data, the first load data including vehicle load data or the second load data including an external load on the vehicle, comparing a summation of the first and second load data to a threshold, and generating an alert for display via a user interface when the summation of the first and second load data exceeds the threshold.

Example 10 includes the method of Example 9, wherein at least one of the first load data or the second load data are received from a sensor including at least one of an occupant sensor, an axle load sensor, a trailer weight sensor, or a fuel level sensor.

Example 11 includes the method of Example 9, wherein the one or more categories include at least one of a vehicle cargo category, an occupants category, a fuel category, an accessories category, or a trailer category.

Example 12 includes the method of Example 9, wherein at least one of the first load data or the second load data are received from an input via a user interface indicating at least one of an accessory mounted to the vehicle, an occupancy of the vehicle, or a trailer coupled to the vehicle.

Example 13 includes the method of Example 12, wherein the user interface receives an input including a load parameter of the accessory.

Example 14 includes the method of Example 9, further including generating a recommendation for display via the user interface, the recommendation to recommend decreasing a load on the vehicle such that the summation does not exceed the threshold.

Example 15 includes the method of Example 14, further including generating the recommendation based on a vehicle profile or a trip parameter used to rank the first and second load, the ranking to determine whether to recommend decreasing the first or the second load.

Example 16 includes a non-transitory computer readable storage medium comprising instructions that, when executed, cause a processor to at least compare a summation of first load data and second load data to a threshold, the first or second load data associated with input from a vehicle sensor or a user interface, sort the first and second load data into one or more categories, each of the categories based on input associated with the first load data or the second load data, the load data including vehicle load data or external vehicle load data, and display the sorted load data.

Example 17 includes the non-transitory computer readable storage medium of Example 16, wherein the instructions, when executed, cause a processor to receive, via the user interface, an input indicating at least one of an accessory mounted to the vehicle, an occupancy of the vehicle, or a trailer coupled to the vehicle.

Example 18 includes the non-transitory computer readable storage medium of Example 17, wherein the instructions, when executed, cause a processor to receive, via the user interface, an input including a load parameter of the accessory.

Example 19 includes the non-transitory computer readable storage medium of Example 16, wherein the instructions, when executed, cause a processor to generate a recommendation for display via the user interface, the recommendation to recommend decreasing at least one of a first or second load such that the summation does not exceed the threshold.

Example 20 includes the non-transitory computer readable storage medium of Example 19, wherein the instructions, when executed, cause a processor to generate the recommendation based on a vehicle profile or a trip parameter used to rank the first and second load, the ranking to determine whether to recommend decreasing the first or the second load.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    comparing a summation of first load data and second load data to a threshold, the first load data associated with input from a vehicle, sensor second load data associated with a user interface;
    sorting the first and second load data into one or more categories, each of the categories based on input associated with the first load data or input associated with the second load data, the second load data including vehicle load data or external vehicle load data; and
    displaying the sorted load data.

2. The method of claim 1, wherein the sensor includes at least one of an occupant sensor, an axle load sensor, a trailer weight sensor, or a fuel level sensor.

3. The method of claim 1, wherein the one or more categories include at least one of a vehicle cargo category, an occupants category, a fuel category, an accessories category, or a trailer category.

4. The method of claim 1, further including receiving, via the user interface, an input indicating at least one of an accessory mounted to the vehicle, an occupancy of the vehicle, or a trailer coupled to the vehicle.

5. The method of claim 4, further including receiving, via the user interface, an input including a load parameter of the accessory.

6. The method of claim 1, further including generating a recommendation for display via the user interface, the recommendation to recommend decreasing at least one of a first or second load such that the summation does not exceed the threshold.

7. The method of claim 6, further including generating the recommendation based on a vehicle profile or a trip parameter used to rank the first and second load, the ranking to determine whether to recommend decreasing the first or the second load.

8. The method of claim 7, wherein the trip parameter is based upon at least one of a length of trip or a destination determined by at least one of a navigation system of the vehicle or a schedule associated with a user of the vehicle.

9. A method, comprising:
categorizing first load data and second load data associated with a vehicle into one or more categories, each of the categories based on sensor input associated with the first load data or user input associated with the second load data, the first load data including vehicle load data and the second load data including an external load on the vehicle;
comparing a summation of the first and second load data to a threshold; and
generating an alert for display aria a user interlace when the summation of the first and second load data exceeds the threshold.

10. The method of claim 9, wherein at least one of the first load data or the second load data are received from a sensor including at least one of an occupant sensor, an axle load sensor, a trailer weight sensor, or a fuel level sensor.

11. The method of claim 9, wherein the one or more categories include at least one of a vehicle cargo category, an occupants category, a fuel category, an accessories category, or a trailer category.

12. The method of claim 9, wherein at least one of the first load data or the second load data are received from an input via a user interface indicating at least one of an accessory mounted to the vehicle, an occupancy of the vehicle, or a trailer coupled to the vehicle.

13. The method of claim 12, wherein the user interface receives an input including a load parameter of the accessory.

14. The method of claim 9, further including generating a recommendation for display via the user interface, the recommendation to recommend decreasing a load on the vehicle such that the summation does not exceed the threshold.

15. The method of claim 14, further including generating the recommendation based on a vehicle profile or a trip parameter used to rank the first and second load, the ranking to determine whether to recommend decreasing the first or the second load.

16. A non-transitory computer readable storage medium comprising instructions that, when executed, cause a processor to at least:
comparing a summation of first load data and second load data to a threshold, the first load data associated with input from a vehicle sensor and second load data associated with a user interface;
sorting the first and second load data into one or more categories, each of the categories based on input associated with the first load data or input associated with the second load data, the second load data including vehicle load data or external vehicle load data; and
displaying the sorted load data.

17. The non-transitory computer readable storage medium of claim 16, wherein the instructions, when executed, cause a processor to receive, via the user interface, an input indicating at least one of an accessory mounted to the vehicle, an occupancy of the vehicle, or a trailer coupled to the vehicle.

18. The non-transitory computer readable storage medium of claim 17, wherein the instructions, when executed, cause a processor to receive, via the user interface, an input including a load parameter of the accessory.

19. The non-transitory computer readable storage medium of claim 16, wherein the instructions, when executed, cause a processor to generate a recommendation for display via the user interface, the recommendation to recommend decreasing at least one of a first or second load such that the summation does not exceed the threshold.

20. The non-transitory computer readable storage medium of claim 19, wherein the instructions, when executed, cause a processor to generate the recommendation based on a vehicle profile or a trip parameter used to rank the first and second load, the ranking to determine whether to recommend decreasing the first or the second load.

* * * * *